(12) United States Patent
Choi et al.

(10) Patent No.: US 10,816,810 B1
(45) Date of Patent: Oct. 27, 2020

(54) HEAD MOUNTED DISPLAY APPARATUS

(71) Applicant: HTC Corporation, Taoyuan (TW)

(72) Inventors: Iok Kan Choi, Taoyuan (TW); Po-Sen Yang, Taoyuan (TW); Shiang-Ting Wan, Taoyuan (TW); Ling-Yi Ding, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/600,582

(22) Filed: Oct. 14, 2019

Related U.S. Application Data

(60) Provisional application No. 62/830,572, filed on Apr. 8, 2019.

(51) Int. Cl.
*G06K 9/00* (2006.01)
*H04N 5/225* (2006.01)
*H04N 5/33* (2006.01)
*G02B 27/01* (2006.01)

(52) U.S. Cl.
CPC ..... *G02B 27/0172* (2013.01); *G02B 27/0176* (2013.01)

(58) Field of Classification Search
USPC .......................................................... 345/7
See application file for complete search history.

(56) References Cited

U.S. PATENT DOCUMENTS

2017/0177075 A1* 6/2017 Zhang ..................... G06T 7/20
2018/0218211 A1* 8/2018 Ishioka ............. G02B 27/0172

* cited by examiner

*Primary Examiner* — Deeprose Subedi
(74) *Attorney, Agent, or Firm* — JCIPRNET

(57) ABSTRACT

A head mounted display apparatus is provided, including a display, at least one image capturing device and an imaging device. The display provides a display image and projects the display image to a target region. The image capturing device is disposed adjacent to the display, and a camera lens of the image capturing device is oriented toward the target region. The imaging device is disposed between the target region and the display.

10 Claims, 3 Drawing Sheets

HEAD MOUNTED DISPLAY APPARATUS

CROSS-REFERENCE TO RELATED APPLICATION

This application claims the priority benefit of U.S. provisional application Ser. No. 62/830,572, filed on Apr. 8, 2019. The entirety of the above-mentioned patent application is hereby incorporated by reference herein and made a part of this specification.

BACKGROUND OF THE INVENTION

Field of the Invention

The disclosure relates to a head mounted display apparatus, and in particular, to a thinner and smaller head mounted display apparatus.

Description of Related Art

With the advancement of electronic technologies, a high-quality image display effect is no longer an unreachable dream. In current technology, head mounted display apparatuses that provide image display effects of virtual reality, augmented reality and even mixed reality have become a mainstream.

In a conventional head mounted display apparatus, in order to detect a position state of an eyeball of a user, an image capturing device is often used to capture an image of the eyeball, and the position of the eyeball is detected through the captured image. However, based on the limitation of the space of the head mounted display apparatus, the conventional image capturing device is often disposed at a position where the image of the eyeball may not be directly captured, and an optical element must be disposed in a tube of the head mounted display apparatus, so that the image capturing device may capture the image of the eyeball of the user by light deflection. In this way, the tube of the head mounted display apparatus must have a certain space to accommodate the optical element, so that the overall size of the head mounted display apparatus may not be reduced.

SUMMARY OF THE INVENTION

The invention provides a head mounted display apparatus, which effectively reduces the number of required optical elements, and the overall size of the head mounted display apparatus may be reduced.

The head mounted display apparatus of the invention includes a display, at least one image capturing device and an imaging device. The display provides a display image and projects the display image to a target region. The image capturing device is disposed adjacent to the display, and a camera lens of the image capturing device is oriented toward the target region. The imaging device is disposed between the target region and the display.

Based on the above, in the invention, the image capturing device is disposed adjacent to the display, and the camera lens of the image capturing device may be directly oriented toward the target region to capture an image of the target region. In this way, the optical element configured to deflect light and disposed in a tube in the head mounted display apparatus may be omitted, so that the length of the tube may be effectively reduced, and the head mounted display apparatus may be thin and small.

To make the features and advantages of the invention clear and easy to understand, the following gives a detailed description of embodiments with reference to accompanying drawings.

DESCRIPTION OF THE EMBODIMENTS

Figure 1:
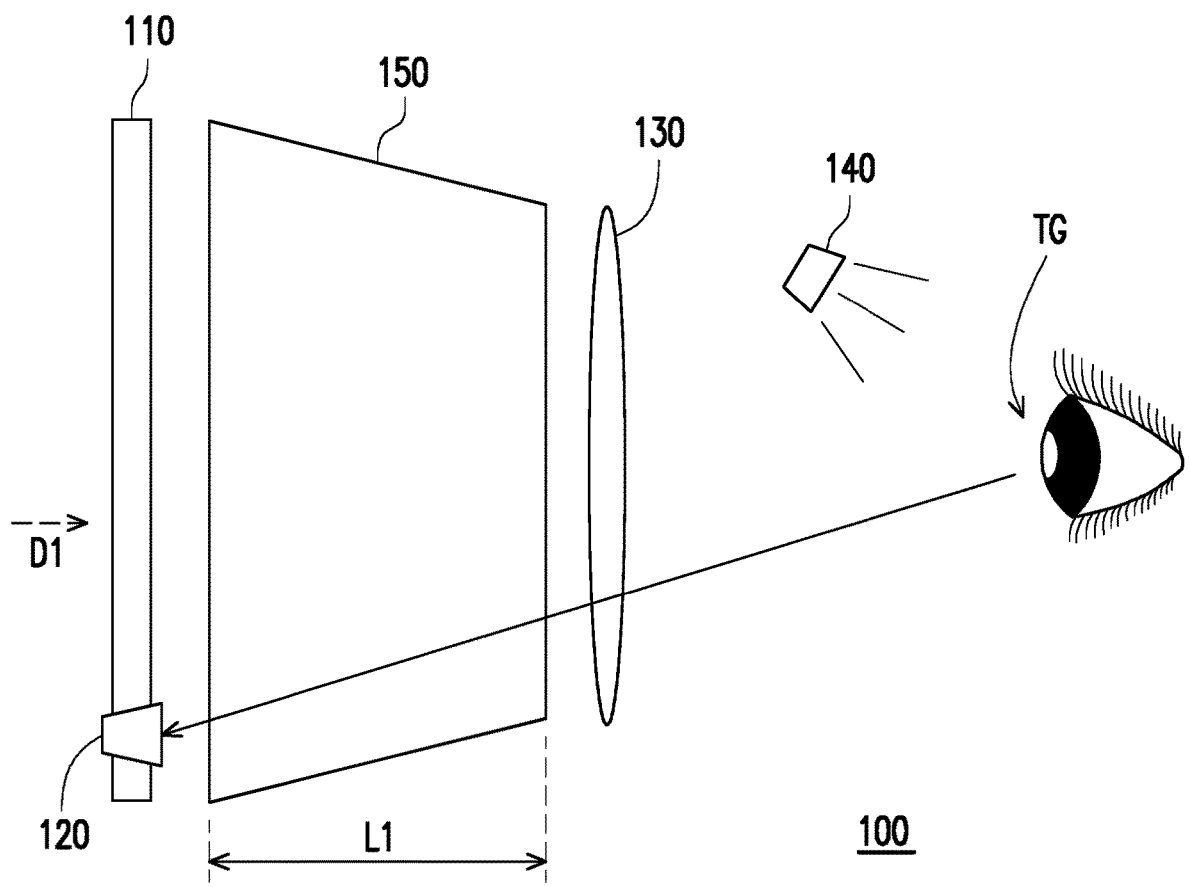
FIG. 1 is a schematic diagram of a head mounted display apparatus according to one embodiment of the invention.

Referring to FIG. 1, FIG. 1 illustrates a schematic diagram of a head mounted display apparatus according to one embodiment of the invention. A head mounted display apparatus 100 includes a display 110, an image capturing device 120, an imaging device 130, a light source 140 and a tube 150. The display 110 is configured to provide a display image and project the display image to a target region TG. In the present embodiment, the target region TG may correspond to a position of an eyeball of a user. The image capturing device 120 is disposed adjacent to the display 110 based on a direction D1. A camera lens of the image capturing device 120 is oriented toward the target region TG. That is, the image capturing device 120 may directly capture an image on the target region TG through the imaging device 130. In addition, the tube 150 is formed between the display 110 and the imaging device 130. In the present embodiment, the tube 150 does not need to be provided with an optical element for light deflection, so that a length L1 of the tube 150 may be shortened as much as possible.

In order to perform a tracking action for the eyeball of the user, one or more light sources 140 may be disposed in the head mounted display apparatus 100. The light sources 140 may emit a light beam to the target region TG and form one or more reflective light spots on the eyeball of the user. The head mounted display apparatus 100 may determine an instantaneous position of the eyeball of the user through the image captured by the image capturing device 120 to complete the tracking action for the eyeball. In the present embodiment, the light sources 140 may transmit an infrared beam, and the image capturing device 120 may be a camera capable of capturing an infrared image. It is worth mentioning that in the embodiment of the invention, the number of the light sources 140 is not particularly limited. The positions of the light sources 140 may be set according to the position of the target region TG, without a fixed limitation.

In the present embodiment, the imaging device 130 may be disposed through a single lens (e.g., a convex lens), or may also be disposed through a lens group formed by a plurality of lenses. The imaging device 130 may be implemented in accordance with a combination of one or more lenses well known to those of ordinary skill in the art, without a fixed limitation.

Figure 2:
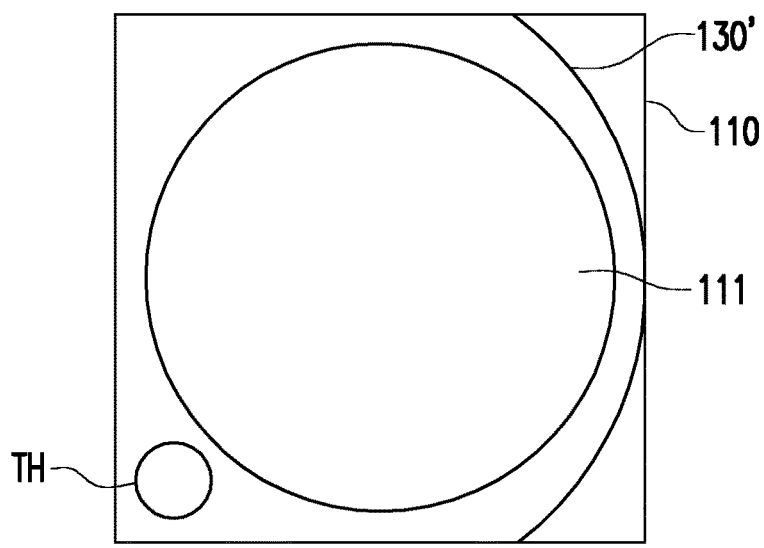
FIG. 2 illustrates a top view of configuration positions of an image capturing device and a display based on a direction D1 in the embodiment of FIG. 1.

It is worth mentioning that in the present embodiment, the image capturing device 120 is embedded on the display 110. Referring to FIG. 2 for details, FIG. 2 illustrates a top view of configuration positions of the image capturing device and the display based on the direction D1 in the embodiment of FIG. 1. An orthographic projection plane 130' of the imaging device 130 on the display 110 and part of the display 110 overlap each other. Furthermore, the display 110 has an effective display region 111, and the orthographic projection plane 130' of the imaging device 130 completely covers the effective display region 111. The effective display region 111 is an effective region configured to display image content, of the display 110. Conversely, a non-effective display region outside the effective display region 111 is not configured to display the image content.

On another aspect, a through hole TH is formed in the non-effective display region on the display 110, and is covered by the orthographic projection plane 130' of the imaging device 130. The image capturing device 120 may then be disposed and fixed in the through hole TH.

In FIG. 2, the through hole TH is in a round shape. However, in other embodiments of the invention, there is no fixed limitation to the shape of the through hole TH. The shape of the through hole TH may be set correspondingly according to the image capturing device 120 to be configured.

It should be noted here that in other embodiments of the invention, the quantity of the image capturing device of the head mounted display apparatus may be more than one. In the region that is covered by the orthographic projection plane 130' of the imaging device 130 and that is in the non-effective display region on the display 110, a plurality of through holes may be formed and configured to accommodate a plurality of image capturing devices respectively.

Figure 3:
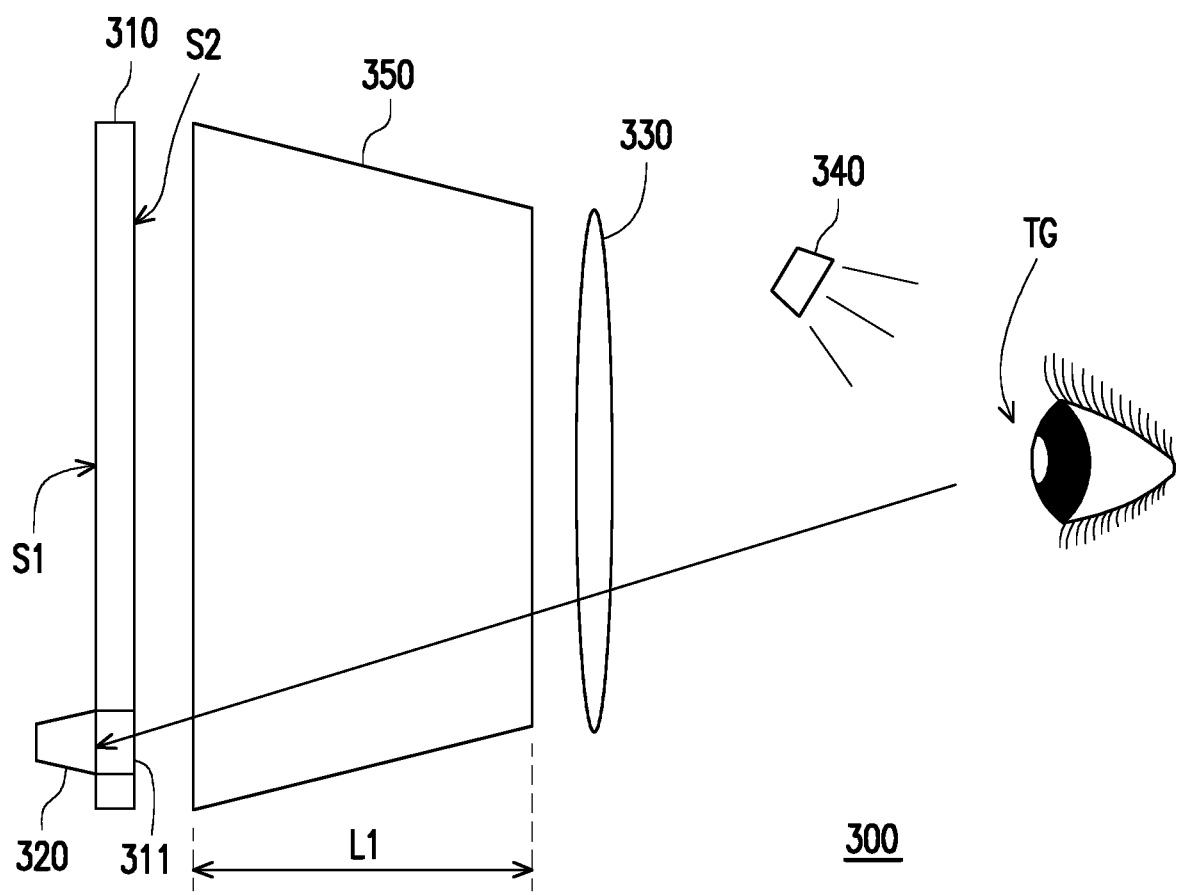
FIG. 3 is a schematic diagram of a head mounted display apparatus according to another embodiment of the invention.

Referring to FIG. 3 below, FIG. 3 illustrates a schematic diagram of a head mounted display apparatus according to another embodiment of the invention. A head mounted display apparatus 300 includes a display 310, an image capturing device 320, an imaging device 330, a light source 340 and a tube 350. In the present embodiment, a target region TG may correspond to a position of an eyeball of a user. The image capturing device 320 is disposed adjacent to the display 310. A camera lens of the image capturing device 320 is oriented toward the target region TG. That is, the image capturing device 320 may directly capture an image on the target region TG through the imaging device 330. In addition, the tube 350 is formed between the display 310 and the imaging device 330.

It should be noted here that in the present embodiment, the display 310 has a light penetrating region 311, and the light penetrating region 311 is formed on a non-effective display region of the display 310. The image capturing device 320 is disposed corresponding to the light penetrating region 311. The image capturing device 320 is disposed on a first side S1 of the display 310, and the lens of the image capturing device 320 may be oriented toward or fitted to the light penetrating region 311, so that the image capturing device 320 performs image capturing action on the target region TG through the light penetrating region 311. Also, a second side S2 of the display 310 is oriented toward the target region TG, and the first side S1 and the second side S2 of the display 310 are two opposite sides.

Similar to the embodiment of FIG. 1, no optical element needs to be disposed in the tube 350 of the head mounted display apparatus 300 of the embodiment of FIG. 3 of the invention to perform light deflection action, so that a length L1 of the tube 350 may be effectively reduced.

In other embodiments of the invention, the quantity of the light penetrating region on the display 310 may be more than one, and there may also be a plurality of image capturing devices correspondingly disposed, without a fixed limitation.

Figure 4:
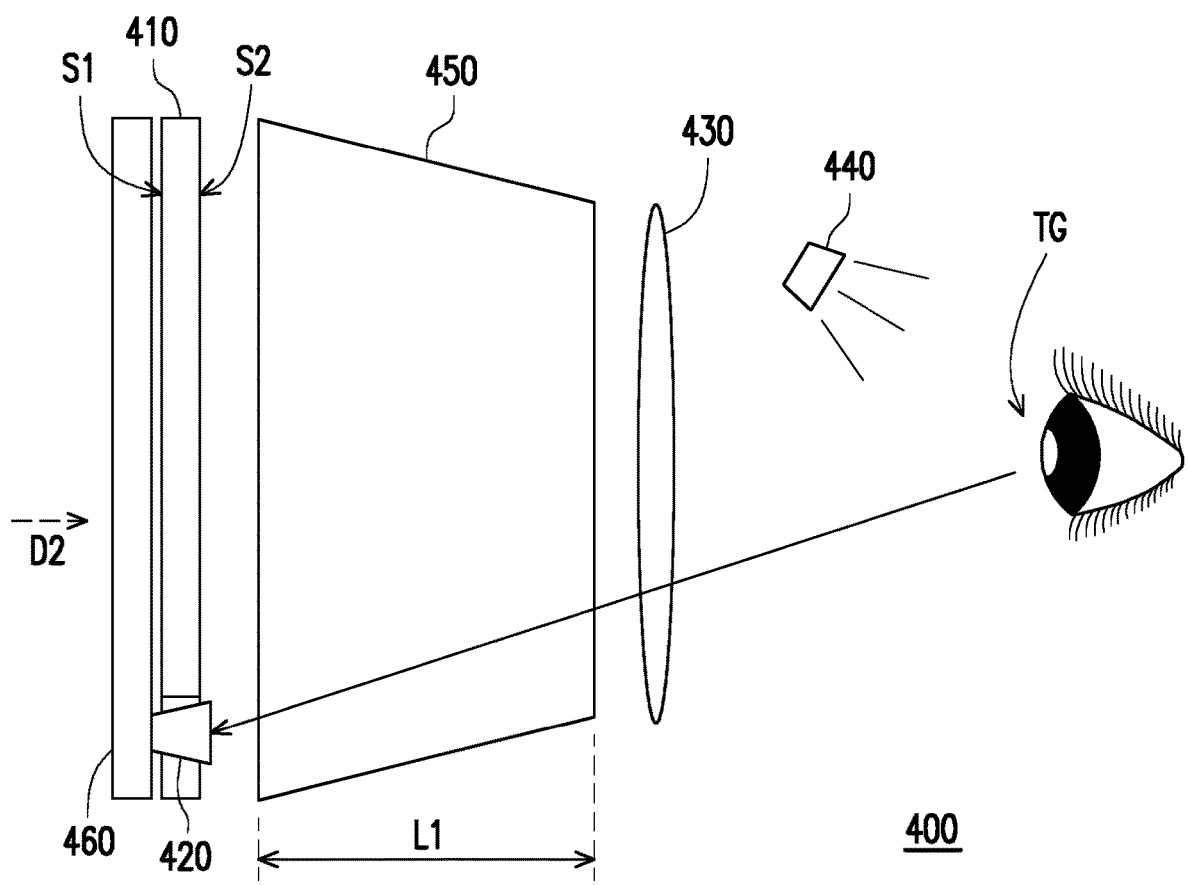
FIG. 4 is a schematic diagram of a head mounted display apparatus according to another embodiment of the invention.

Referring to FIG. 4 next, FIG. 4 illustrates a schematic diagram of a head mounted display apparatus according to another embodiment of the invention. A head mounted display apparatus 400 includes a display 410, an image capturing device 420, an imaging device 430, a light source 440, a tube 450 and a support portion 460. In the present embodiment, a target region TG may correspond to a position of an eyeball of a user. The image capturing device 420 is disposed adjacent to the display 410. A camera lens of the image capturing device 420 is oriented toward the target region TG. That is, the image capturing device 420 may directly capture an image on the target region TG through the imaging device 430. In addition, the tube 450 is formed between the display 410 and the imaging device 430.

In the present embodiment, the support portion 460 is a light penetrable component and is disposed adjacent to the display 410. In detail, the support portion 460 is disposed adjacent to a first side S1 of the display 410. The first side S1 and a second side S2 of the display 410 are two opposite sides, and the second side S2 of the display 410 is oriented toward the target region TG and is adjacent to the tube 450.

It should be noted here that in the present embodiment, the image capturing device 420 is disposed and fixed on the support portion 460. A cut-out corner is formed at a position corresponding to the image capturing device 420 on the display 410. The image capturing device 420 may be accommodated in a space formed by the cut-out corner. For a position relationship of the display 410, the image capturing device 420 and the support portion 460, a top view, illustrated in FIG. 5, of configuration positions of the display, the image capturing device and the support portion based on a direction D2 in the embodiment of FIG. 4 may be referred to.

Figure 5:
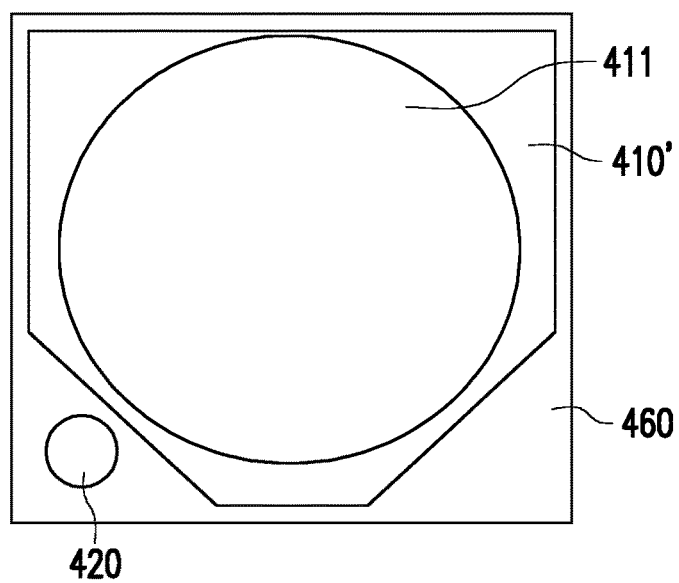
FIG. 5 illustrates a top view of configuration positions of a display, an image capturing device and a support portion based on a direction D2 in the embodiment of FIG. 4.

In FIG. 5, a plurality of cut-out corner structures is formed on the display 410, and an orthographic projection plane 410' is formed on the support portion 460. The orthographic projection plane 410' includes an effective display region 411. The orthographic projection plane 410' of the display 410 partially overlaps the support portion 460. The image capturing device 420 is disposed on a non-overlap region, which is not covered by the orthographic projection plane 410', in the support portion 460. In the present embodiment, the cut-out corner structures formed on the display 410 are located at corners of the display 410, so that the aforementioned non-overlap region may be formed on one or more corners of the support portion 460.

It should be noted here that in FIG. 4, the cut-out corner structure formed on the display 410 is triangular, which is merely an illustrative example. In the embodiment of the invention, there is no fixed limitation to the shape of the cut-out corner structure formed on the display 410, and the shape may be set by a designer. For example, it may be a rectangle, a circular arc, a regular polygon or an irregular polygon. Moreover, there is no fixed limitation to the quantity of the cut-out corner structure formed on the display 410, either.

Through the aforementioned arrangement mode, the image capturing device 420 of the head mounted display apparatus 400 may allow the camera lens to be directly oriented toward the target region TG and perform the image capturing action on the target region TG. That is, no optical element needs to be disposed in the tube 450, and a length L1 required by the tube 450 may be effectively reduced.

Based on the above, in the invention, the image capturing device is disposed adjacent to the display, and the camera lens of the image capturing device is directly oriented toward the target region to capture an image of the target region. In this way, it is not necessary to set an extra optical element in the tube disposed between the display and the target region, and the hardware cost of a head mounted display is effectively reduced. Furthermore, without disposing the extra optical element, the length of the tube may be effectively reduced, so that the size of the head mounted display apparatus may be reduced to meet the design requirements for thinness and small size.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A head mounted display apparatus, comprising:
    a display, providing a display image and projecting the display image to a target region;
    at least one image capturing device, disposed adjacent to the display, wherein a camera lens of the image capturing device is oriented toward the target region; and
    an imaging device, disposed between the target region and the display,
    wherein the imaging device comprises an orthographic projection plane on the display, the orthographic projection plane completely covers an effective display region of the display and the at least one image capturing device, and in the orthographic projection plane, the at least one image capturing device is outside the effective display region of the display.

2. The head mounted display apparatus according to claim 1, wherein a non-effective display region of the display comprises at least one through hole, the at least one through hole is covered by the orthographic projection plane, and the at least one image capturing device is disposed in the at least one through hole.

3. The head mounted display apparatus according to claim 1, wherein a non-effective display region of the display comprises at least one light penetrating region, and the at least one image capturing device is disposed on the at least one light penetrating region.

4. The head mounted display apparatus according to claim 3, wherein the at least one light penetrating region is located between the at least one image capturing device and the target region.

5. The head mounted display apparatus according to claim 1, further comprising:
    a support portion, disposed on a first side of the display and superimposed on the display, wherein a second side of the display is oriented toward the target region.

6. The head mounted display apparatus according to claim 5, wherein at least one non-overlap region exists between an orthographic projection plane of the display on the support portion and the support portion, and the at least one image capturing device is disposed on the non-overlap region on the support portion.

7. The head mounted display apparatus according to claim 6, wherein the at least one non-overlap region is located on at least one corner of the support portion.

8. The head mounted display apparatus according to claim 1, furthercomprising:
    at least one light source, configured to project at least one light beam to the target region.

9. The head mounted display apparatus according to claim 1, wherein the imaging device comprises at least one lens.

10. The head mounted display apparatus according to claim 1, further comprising a tube, wherein the tube is disposed in the imaging device and the display.

* * * * *